United States Patent [19]

Cicchiello et al.

[11] Patent Number: 5,104,552
[45] Date of Patent: Apr. 14, 1992

[54] REDUCTION OF CLAY IN SLUDGES TO BE DEWATERED

[75] Inventors: James V. Cicchiello, Westchester, N.Y.; Don Seagle, Chattanooga, Tenn.

[73] Assignee: American Cyanamid Company, Stamford, Conn.

[21] Appl. No.: 611,227

[22] Filed: Nov. 8, 1990

[51] Int. Cl.⁵ ............................................ C02F 11/14
[52] U.S. Cl. .................................. 210/727; 210/734; 210/735
[58] Field of Search ............... 210/727, 728, 734, 735, 210/778, 609

[56] References Cited

U.S. PATENT DOCUMENTS

| | | |
|---|---|---|
| 3,894,944 | 7/1975 | Panzer et al. ........................ 210/736 |
| 3,953,330 | 4/1976 | Tonkyn et al. ...................... 210/736 |
| 3,968,037 | 7/1976 | Morgan et al. ...................... 210/734 |
| 4,172,066 | 10/1979 | Zweigle et al. ................... 252/8.554 |
| 4,454,047 | 6/1984 | Becker et al. ....................... 210/734 |
| 4,525,527 | 6/1985 | Takeda et al. ....................... 210/734 |
| 4,720,346 | 1/1988 | Flesher et al. ...................... 210/734 |
| 4,769,427 | 9/1988 | Nowakowsky et al. ............. 526/64 |
| 4,968,435 | 11/1990 | Neff et al. ............................ 210/734 |
| 4,969,976 | 11/1990 | Reed ................................... 162/164.6 |

Primary Examiner—Peter Hruskoci
Attorney, Agent, or Firm—Frank M. Van Riet

[57] ABSTRACT

The dewatering of waste industrial and municipal sludges is improved by the use of clay employed with an unsheared, water-soluble, branched cationic polymer having a solubility quotient greater than about 30% and a branching agent content of from about 4-80 molar parts per million, based on initial monomer content.

6 Claims, No Drawings

REDUCTION OF CLAY IN SLUDGES TO BE DEWATERED

BACKGROUND OF THE INVENTION

The process of dewatering waste sludges begins with a conditioning or flocculation step. Flocculation is the mechanism wherein suspended matter in the waste stream, which is present as a disperse phase is charge neutralized and thereby coagulated or coalesced. Subsequent treatment of this flocculated mass involves dewatering which is carried out mechanically.

Waste matter which is produced biologically, i.e., a secondary sludge, can originate, from an industrial process or from municipal sewage. Such a sludge consists of high levels of cell bodies, most often as finely divided organic sediments, and requires a conditioning before dewatering. Also, the solids are low, which makes the conditioning all the more difficult. Blending with other sludges may be carried out to increase these solids.

The conditioning of the waste matter may be effected by the addition of an inorganic filler such as clay or fly ash. The purpose of the filler is to provide greater surface area, weight and density to the mass. Subsequently, a cationic polymer is often added to accomplish charge neutralization since both the cellular bodies and the clay bear negative surface charges. A flocculation results and the mass is then more readily dewatered by mechanical means. A popular and effective device for the latter dewatering stage is one that provides a pressing action to facilitate release of free water. Belt-filter, filter and screw presses are examples of these devices.

Reference is made to the publications of Poduska and Stroupe and Poduska and Collins, Proc. Ind. Waste Conference 198135437 and Environmental Technology Letters 1547 (1980), respectively, in which dewatering of activated sludges derived from chemical, plastics and fiber production process wastes are described.

In these reports the advantages of the belt filter press as a mechanical aid to dewatering along with clay and cationic polymers are elucidated. Process optimization is demonstrated using a laboratory apparatus for studying the effects of polymer dose, dilution, mixing intensity and duration, gravity and compression drainage, sludge pH and temperature on flocculation.

The type of polymer used with clay in the aforementioned publications is a copolymer of acrylamide and a quaternary ester such as methacroyloxyethyl trimethylammonium chloride or methosulfate. Usually a fairly high mole % of the cationic component is incorporated, e.g., 20 and 60 mole %, but an even higher ratio may be used and sometimes the homopolymer of the cationic monomer is found effective.

The molecular weight of the polymer applied along with the clay is above one million and may exceed 5 to 10 million. Usually the higher molecular weight polymers are preferred because they are more effective. The clay employed is preferably a bentonite but other clays such as Kaolin clay may also be used.

SUMMARY OF THE INVENTION

It has now been discovered that the dewatering of clay treated, waste-activated sludges can be more effectively accomplished by adding thereto a high molecular weight, highly branched, water-soluble, cationic polymer which is made without the use of any high level of shear. These polymers are the subject of the copending U.S. application Ser. No. 07/285,933 filed Dec. 12, 1988. They are characterized by a solution viscosity of at least 1.8 mPa's preferably at least about 2.4 mPa's, measured by a Brookfield viscometer with a UL adaptor at 25 # on a 0.1%, by weight, polymer solution in 1 M NaCl at 60 rpm, a solubility quotient of greater than about 30%, and a branching agent content of from about 4 to about 80 molar parts per million, based on initial monomer content.

The effectiveness of the branched polymer, when used in conjunction with clay, is demonstrated by the large reduction in the amount of clay that must be applied to condition the waste matter. Thus, for example, as much as 50% of the clay normally employed can be eliminated by use of the branched polymers in accordance with this invention. The importance of such an advance is immediately obvious, especially when one considers that over 50,000 lbs. (dry weight) per day of sludge are produced in large plants. Less fuel is needed to effect incineration of the sludge, the ash volumes generated during burning of the dewatered cake are substantially reduced and subsequent costs associated with hauling the ash away are significantly reduced. In pumping the sludge to the incinerator, the cost is also reduced because of the lesser weight and density of the resultant sludges. If the sludges are to be brought to landfill instead of to incineration, the transportation costs are significantly reduced and the volume of landfill lowered. The latter is an important factor when one considers the present shortage of landfill sites and the rapid rate with which existent sites are becoming exhausted.

Description Of The Invention Including Preferred Embodiment

In practicing the process of the present invention, the clay or fly ash conditioner is first applied to the activated sludge suspension and then the cationic polymer is added. A 1 to 10% solids suspension drawn from a digester etc. is treated, typically with a 1 to 5% of a bentonite clay slurry, and then with the high molecular weight polymer in the form of a 0.5% to 1.0% solution in water is added. The concentration of the polymer solution is optimized for the particular clay and sludge substrate. A 0.1 to 0.5% solution of the polymer is often employed in the treatment. The clay level applied is normally 150 to 500 lbs. per dry ton of sludge. A level of polymer is added to the clay and sludge for optimum conditioning; generally, from about 5 pounds to 20 pounds of dry polymer for every 100 pounds of clay. The process stream is then passed through a mixing stage and onto a pressure belt where the dewatering is completed. The filtrate is recycled, while the cake discharge, at about a 10 to 20% solids level, is drawn off and brought to incineration or landfill.

The branched polymers useful in the process of the present invention are made by the polymerization of cationic, ethylenically unsaturated monomers, alone or in conjunction with other comonomers and in the presence of a branching agent and a chain transfer agent.

Cationic monomers useful in producing these polymers include diallyldimethylammonium chloride; acryloxyethyltrimethylammonium chloride; (meth)acrylates of N,N-dialkylaminoalkyl compounds and quaternaries and salts thereof such as N,N-dimethylaminoalkyl (meth)acrylamides and salts and quaternaries thereof; N,N-dialkyaminoethylacrylamides; methacrylamidopropyltrimethylammonium chloride; 1- methacryloxy-1-4-methyl piperazine and the like. Such cationic monomers are generally of the following formulae:

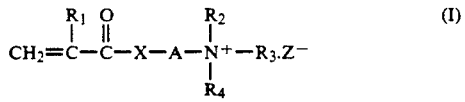

where $R_1$ is hydrogen or methyl, $R_2$ is hydrogen or lower alkyl, i.e. $C_1$ to $C_4$, $R_4$ and $R_3$ are alkyl of $C_1$ to $C_{12}$, aryl or hydroxyethyl and $R_2$ and $R_3$ or $R_2$ and $R_4$ can combine to form a cyclic ring containing one or more hetero atoms, Z is the conjugate base of an acid, X is oxygen or $-NR_1-$ wherein $R_1$ is as defined above, and A is an alkylene group of $C_1-C_{12}$; or

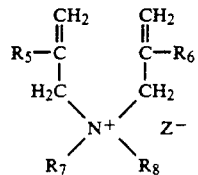

where $R_5$ and $R_6$ and hydrogen or methyl, $R_7$ is hydrogen, alkyl of $C_1$ to $C_{12}$ or benzyl, and $R_8$ is hydrogen, alkyl of $C_1$ to $C_{12}$ benzyl or hydroxyethyl; and Z is as defined above.

Comonomers, suitable for copolymerization with the cationic monomers, above, generally comprise acrylamide; methacrylamide; N-alkylacrylamides such as N-methylacrylamide; N,N-dialkylacrylamides such as N,N-dimethylacrylamide; methyl acrylate; methyl methacrylate; acrylonitrile: N-vinylmethylacetamide or formamide; vinyl acetate or vinyl pyrrolidone, and the like. Preferably a nonionic monomer, such as an acrylamide is copolymerized with a cationic comonomer to produce cationic copolymers. From about 10 to about 99 parts, by weight of the non-ionic monomer and from about 90 to about 1.0 part, by weight of the cationic comonomer, may be employed. Terpolymers may also be used.

Polymerization of the monomers is conducted in the presence of a polyfunctional branching agent to form the structured cationic homopolymer or copolymer. Useful polyfunctional branching agents comprise a compound having either at least two double bonds, a double bond and a reactive group or two reactive groups. Polyfunctional branching agents should have at least some water-solubility. Illustrative of those containing at least two double bonds are methylenebisacrylamide; methylenebismethacrylamide; polyethylene glycol diacrylate; polyethyleneglycol dimethacrylate; N-vinylacrylamide; divinybenzene; triallylammonium salts; N-methylallylacrylamide, and the like. Polyfunctional branching agents containing at least one double bond and at least one reactive group include glycidyl acrylate; acrolein; methylolacrylamide; and the like. Polyfunctional branching agents are used in sufficient quantities to assure a highly structured, copolymer product, having a branching agent content of from about 4 to about 80 molar parts per million, based on initial monomer content, preferably from about 7 to about 20 molar parts per million, same basis.

A molecular weight modifying or chain-transfer agent to control the structure and solubility of the cationic polymer is also added. In the absence of a chain-transfer agent, the incorporation of even extremely small amounts of branching agent, e.g., 5 parts per million may cause crosslinking, rendering the polymer insoluble in water. However, water-soluble, highly branched cationic polymer products are obtained when a chain-transfer agent is used, in optimum concentration, in conjunction with said branching agent. Many such chain-transfer agents are well known to those skilled in the art. These include alcohols; mercaptans; thioacids; phosphites and sulfites; such as isopropyl alcohol and sodium hypophosphite although many other different chain-transfer agents may be employed.

It is extremely important that optimum concentrations of chain-transfer agent be applied in order to produce a highly branched water-soluble polymer. Addition of too little chain transfer agent produces a nonsoluble polymer and the addition of too much chain-transfer agent produces a polymer with too low a solution viscosity, i.e. molecular weight.

The optimum concentration of chain-transfer agent can be determined by measuring the solubility quotient. The solubility quotient is defined as the total mole % cationicity in the polymer as determined by an anion binding technique (CEQ), e.g., colloid titration, divided by the total cationicity as determined by an analytical technique which does not depend on anion binding, using, e.g., nuclear magnetic resonance, infrared spectroscopy or chemical analysis, the quotient of which is multiplied by 100. The cationicity is determined by measuring the CEQ as described in Volume 62, Number 7 of the Journal of Chemical Education dated July 1985, pages 627 to 629, which comprises measuring the cationicity of a solution using colloid titration to determine the solubility in water. Use of a chain-transfer agent in concentrations such that the solubility quotient is less than 30 percent provides polymers that are poorly soluble. Only when optimum concentrations are used, effectuating a solubility quotient greater than 30 percent, do the polymers exhibit the required solubility characteristics. Thus, the soluble cationics polymers all possess a minimum solubility quotient of over 30 percent, preferably over 40 percent and even more preferably over 50 percent. Many exhibit a solubility quotient of greater than 90 percent.

Actual polymerization may be carried out using gel or emulsion (suspension) polymerization techniques. These techniques are widely known to those skilled in the art.

Emulsion polymerization procedures involve the preparation of two phases. The aqueous phase comprises the monomer(s), branching agent and chain-transfer agent dissolved in deionized water, and other additives well known to those skilled in this art, such as stabilizers and pH adjusters. The oil phase comprises a water-insoluble hydrocarbon solution of surfactant(s). The aqueous phase and oil phase are then mixed and homogenized in a conventional apparatus until particle size is in the 1.0 micron range and a suitable bulk viscosity is obtained. The emulsion, is then transferred to a suitable flask wherein the emulsion is agitated and sparged with nitrogen for about thirty minutes. A polymerization initiator, such as sodium metabisulfite solution, is then continuously added to the solution to begin polymerization. Polymerization is allowed to exotherm to the desired temperature which is maintained by cooling until cooling is no longer required. Finished emulsion product is cooled to 25° C.

In a typical gel polymerization procedure, monomer(s), branching agent and chain-transfer agent are dissolved in deionized water and the pH is adjusted as desired. The solution is placed in a polymerization vessel and sparged with nitrogen with the temperature of the solution adjusted to about 6° C. An initiator is then added, and the polymerization is allowed to exotherm to maximum temperature. Once maximum temperature is attained, the medium is placed in an oven at about 70° C. for about 8 hours. The resulting gel is reduced to gel worms, air dried and reduced to powder.

Any conventional additives may be used to stabilize the monomer solutions. Suitable additives include ammonium sulfate, ethylenediaminetetraacetic acid (disodium salt) and diethylene triaminepentaacetate (pentasodium salt). See Modern Plastics Encyclopedia/88, McGraw Hill, October 1987, pp. 147-8.

Any known free radical initiators may be employed to initiate polymerization. Suitable for use are azobisisobutyronitrile; oxygen with sodium sulfite and/or sodium metabisulfate, 2,2'-azobis(2-methyl-2-amidinopropane) dihydrochloride; ammonium persulfate and ferrous ammonium sulfate hexahydrate, and other redox pairs. Organic peroxides may also be employed for polymerizing ethylenically unsaturated monomers. Many are suitable, but particularly useful is t-butyl hydroperoxide: see e.g. Modern Plastics Encyclopedia/898, McGraw Hill, October 1987, pp. 165-8.

The following examples are set forth for purposes of illustration only and are not to be construed as limitations on the present invention except as set forth in the appended claims. All parts and percentages are expressed in weight/weight relationships unless otherwise specified.

EXAMPLE 1

A waste activated sludge suspension produced from a chemical industry process stream and containing 2.74% solids in treated with a 2% suspension of bentonite clay in water and then with a commercially available cationic polymer designated Polymer A which contains 55 mole% of methacryloxyethyl trimethylammonium chloride, the remaining groups being acrylamide. The solution viscosity of A is approximately 2.5 mPa.s measured on a real polymer basis as indicated above, and its solublity quotient is 90%.

In a similar way the waste activated sludge is treated with the bentonite suspension and then the branched, cationic copolymer. The latter has a solubility quotient of 65%, a branching agent content of 7 ppm and is made with a level of 0.4% isopropanol (chain transfer agent), based on monomer. It has a solution viscosity of 2.6 mPa.s and is synthesized by copolymerizing the same two monomers as in Polymer A according to the above-referenced copending U.S. patent applications. This polymer is designated as Polymer B.

Table 1 compiles the free drainage, % cake solids and other dewatering results along with operating variables obtained on "TETRA PRESS".

| Polymer | # Polymer Dry Ton Sludge | Clay lbs/ton | Filtrate Volume @ 16 sec. | 36 sec. | 60 sec. | Clarity of Filtrate | % Cake Solids | Cake Release |
|---|---|---|---|---|---|---|---|---|
| None | — | 156 | 100 | 100 | 100 | Poor | Low | Poor |
| A | 60 | 78 | 106 | 110 | 114 | Clear | 11.8 | Good |
| A | 60 | 156 | 107 | 110 | 112 | Clear | 12.7 | Excellent |
| B | 60 | 78 | 114 | 117 | 120 | Clear | 12.6 | Excellent |

The data show that the process of the present invention, utilizing a branched-structured polymer, allows a reduction in the amount of clay from 156 lb/ton to 78 lbs/ton with the same or improved release of water from the sludge. This subsequently produces a clear filtrate with equally high cake solids and with excellent release properties from the belt, compared to the use of the commercial cationic polymer with twice the loading of clay.

EXAMPLE 2

Example 1 is repeated using the same "TETRA PRESS", a static sludge pressed, similar to that manufactured by Tetra Engineered Systems of Pittsburgh, Pa., except that acrylamide copolymers containing 50 mole % of a quaternary of dimethylaminoethylmethacrylate are employed, one an article of commerce, the other a structured polymer. The latter is made using about 8 ppm of a crosslinking ingredient and appropriate amounts of a chain transfer agent and has a solution viscosity of 2.9 mPa. The results obtained are essentially the same.

EXAMPLE 3

In this example, a different industrial sludge which yields a very fragile cake and thus has a higher conditioning requirement in treated with commercially available cationic copolymers of acrylamide and methacryloxyethyl trimethylammonium chloride (C and D) and then with the branched and structured polymers E and F. The latter are prepared using 7 to 8 ppm of a branching agent and slightly varying amounts of a chain transfer agent; all four polymers have similar molecular weights. The pressure on the cake is varied slightly because of its fragile character. The results are as follows:

| Polymer | mole % Cationicity | # dry Polymer per dry ton Sludge | Clay lbs/ton | Pressure Applied | Filtrate Volume @ 10 sec. | 20 sec. | Floc. Size | Cake Solids |
|---|---|---|---|---|---|---|---|---|
| C | 35 | 29 | 400 | 10 | 127 | 130 | V. lg. | 9.3 |
| C | 35 | 29 | 300 | 10 | 127 | 130 | large | 8.6 |
| C | 35 | 29 | 500 | 10 | 128 | 131 | v. lg. | 8.9 |
| D | 55 | 29 | 400 | 10 | 122 | 128 | small | 8.4 |
| D | 55 | 29 | 500 | 10 | 126 | 133 | small | 8.4 |

-continued

| Polymer | mole % Cationicity | # dry Polymer per dry ton Sludge | Clay lbs/ton | Pressure Applied | Filtrate Volume @ 10 sec. | Filtrate Volume @ 20 sec. | Floc. Size | Cake Solids |
|---|---|---|---|---|---|---|---|---|
| E | 40 | 14 | 400 | 10 | 126 | 130 | m. lg. | 9.7 |
| F | 55 | 25 | 300 | 15 | 142 | 145 | v. lg. | 10.3 |
| F | 55 | 21 | 400 | 15 | 130 | 133 | large | 11.0 |

The data show the markedly improved performance of the structured and branched copolymers. Higher cake solids can be achieved, especially with the more highly cationic version copolymer F, and the cake is able to withstand higher pressure (15 psi) with a reduced clay loading.

EXAMPLE 4

In this demonstration, a still higher branched copolymer is synthesized by use of additional crosslinking agent (20 ppm based on monomer) and correspondingly higher chain transfer agent content 1.25% and is designated polymer G. It is compared with the commercial polymer D and with the less branched structured polymer F of the preceding examples. The solubility quotients of the structured polymers are both above 85-90% and molecular weights of all three are essentially equivalent.

The runs are carried out at a pressure of 10 psi on the cake to effect dewatering. The results are as follows:

| Polymer | mole % Cationicity | # dry Polymer per dry ton Sludge | Clay lbs/ton | Filtrate Volume @ 10 sec. | Filtrate Volume @ 20 sec. | Floc. Size | Cake Solids |
|---|---|---|---|---|---|---|---|
| D | 55 | 29 | 500 | 122 | 128 | small | 8.4 |
| F | 55 | 25 | 400 | 135 | 137 | large | 9.7 |
| G | 55 | 25 | 400 | 130 | 132 | large | 9.4 |

We claim:

1. In a process of dewatering a waste industrial or municipal sludge on a belt, or filter or screw press device, in which clay is added to said sludge as a conditioner, the improvement which comprises adding to the clay conditional sludge, as a partial replacement of the clay an effective amount of an unsheared water-soluble branched cationic polymer formed from one or more ethylenically unsaturated monomers selected from acrylamide; methacrylamides; N,N-dialkylaminoalkyl acrylates and methacrylates and their quaternary or acid salts; N,N-dialkylaminoalkylacrylamides and methacrylamides and their quaternary or acid salts; or diallyl dimethylammonium salts, with a solution viscosity of at least about 1.8 mPa.s measured in a Brookfield visometer with a UL adapter at 25° C. on a 0.1 percent, by weight, polymer solution in 1M NaCl at 60 rpm, an effective amount of a chain transfer agent to produce a solubility quotient greater than about 30%, and a polyfunctional branching agent content of from 4 to about 80 molar parts per million based on initial monomer content.

2. The process of claim 1 in which the water soluble polymer is formed from acrylamide in combination with at least one cationic monomer.

3. The process of claim 2 in which the water soluble branched polymer has a solubility quotient greater than about 40%.

4. The process of claim 3 in which the water-soluble branched polymers has a branching agent content of from about 7 to about 20 molar parts per million based on original monomer content.

5. A process of claim 1 in which the conditioner is a bentonite clay.

6. A process of claim 1 in which the amount of bentonite clay displaced is up to 50% of the original amount employed.

* * * * *